(12) United States Patent
Shimizu (10) Patent No.: US 10,296,762 B2
(45) Date of Patent: May 21, 2019

(54) PRIVACY ENHANCED PUSH NOTIFICATION (71) Applicant: FUJITSU LIMITED, Kawasaki-shi, Kanagawa (JP)

(72) Inventor: Sho Shimizu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 15/209,646

(22) Filed: Jul. 13, 2016

(65) Prior Publication Data
US 2018/0018474 A1  Jan. 18, 2018

(51) Int. Cl.
*G06F 21/62* (2013.01)

(52) U.S. Cl.
CPC .. *G06F 21/6245* (2013.01); *G06F 2221/2111* (2013.01)

(58) Field of Classification Search
CPC .................................................. G06F 3/0481
See application file for complete search history.

(56) References Cited

U.S. PATENT DOCUMENTS

| | | |
|---|---|---|
| 8,823,507 B1 | 9/2014 | Touloumtzis |
| 9,191,918 B2 | 11/2015 | Dey et al. |
| 9,524,631 B1 * | 12/2016 | Agrawal ................. G08B 21/18 |
| 2009/0328136 A1 | 12/2009 | Wan et al. |
| 2014/0256288 A1 * | 9/2014 | Allen .................... H04W 12/02 455/411 |
| 2015/0163188 A1 * | 6/2015 | Faaborg .................. H04L 51/04 715/753 |

OTHER PUBLICATIONS

Notification settings (Android), Retrieved on Jul. 13, 2016, Retrieved from <https://support.google.com/nexus/answer/6111294?hl=en>.

* cited by examiner

*Primary Examiner* — Josnel Jeudy
(74) *Attorney, Agent, or Firm* — Maschoff Brennan (57) ABSTRACT

A method of privacy enhanced notification includes receiving, by a client device, a notification associated with an application. The method includes identifying a negative situation associated with the client device in response to receiving the notification. The method further includes determining whether the notification includes sensitive data. The method also includes setting a sensitivity flag as true in response to the negative situation and a determination that the notification includes sensitive data. The method includes setting the sensitivity flag as false in response to a determination that the notification does not include sensitive data. The method includes presenting the notification on an electronic display of the client device according to the sensitivity flag.

20 Claims, 7 Drawing Sheets

PRIVACY ENHANCED PUSH NOTIFICATION

FIELD

The embodiments discussed herein are related to privacy enhanced notification.

BACKGROUND

In this information age, there is an overwhelming amount of information readily available and accessible partly due to the ability of individuals to disseminate information freely, quickly, and easily. Often, information may be delivered to a user's mobile device in near real-time as push notifications. Push notifications often may be used to inform users various types of information, such as schedule, new email, or news, etc. In most instances, at least a portion of a push notification may be presented on a display of the user's mobile device.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of privacy enhanced notification includes receiving, by a client device, a notification associated with an application. The method includes identifying a negative situation associated with the client device in response to receiving the notification. The method further includes determining whether the notification includes sensitive data. The method also includes setting a sensitivity flag as true in response to the negative situation and a determination that the notification includes sensitive data. The method includes setting the sensitivity flag as false in response to a determination that the notification does not include sensitive data. The method includes presenting the notification on an electronic display of the client device according to the sensitivity flag.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In this information age, there is an overwhelming amount of information readily available and accessible partly due to the ability of individuals to disseminate information freely, quickly, and easily. Often, digital information may be delivered to a user's mobile device in near real-time as push notifications. Notifications often may be used to digitally inform users various types of information, such as a schedule, a new email, or news, etc. In most instances, at least a portion of a notification may be presented on a display of the user's mobile device. In some instances, the notification may be presented as an overlay in front of content that is being presented on the display. In other examples, the notification may be displayed on a lock screen. Further, the notification may trigger a powered-off display to power on and present the notification on screen without any interaction or input from a user of the device.

Electronic notifications may sometimes include personal information, which may include sensitive information that a user may not want to appear in some situations. Notifications that include sensitive information may be referred to as sensitive notifications. In an example, the user may wish to keep certain information private, such as content of e-mail, or credit card billing/authorization info, etc. Such sensitive notifications may breach user security, or may be embarrassing when presented on the display in undesirable situations. In an attempt to address this problem created by technology, one prior approach includes a method to hide a notification from a specific application that has been marked as sensitive. This approach, however, hides all notifications for the application, which may be detrimental to the user experience because the user may not necessarily desire to hide all notifications from the application. Another approach includes a push notification service where a notification is invoked based solely on context rules without taking a particular user situation or environment into account.

Aspects of the present disclosure address these and other shortcomings of existing notification systems by providing a privacy enhanced notification system to control the display of notifications to improve user privacy. The privacy enhanced notification system may be used to improve a computer-based notification system. For example, the present disclosure may provide benefits to a user who may place his smartphone in a public setting (e.g., on a table with the display being visible to others) while reducing the likelihood of revealing sensitive notifications to others.

As will be explained in more detail below, a privacy enhanced notification system may include a client device and a notification server. When the notification server sends a notification to the client device, the client device may determine a situation, determine whether the user may desire to prevent others from seeing the notification in the situation, and determine whether the notification contains sensitive data. When the results of the above determinations are "YES", the client device may set a sensitivity flag to the notification. A sensitivity flag may indicate how to handle a notification. For example, handling the notification may include one or more of the following: never show the notification, hide the notification until the undesired situation ceases to exist, hide the notification for a particular time period, or hide the notification until a later time or after an event. The client device may determine how to present the notification based on the sensitivity flag.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1:
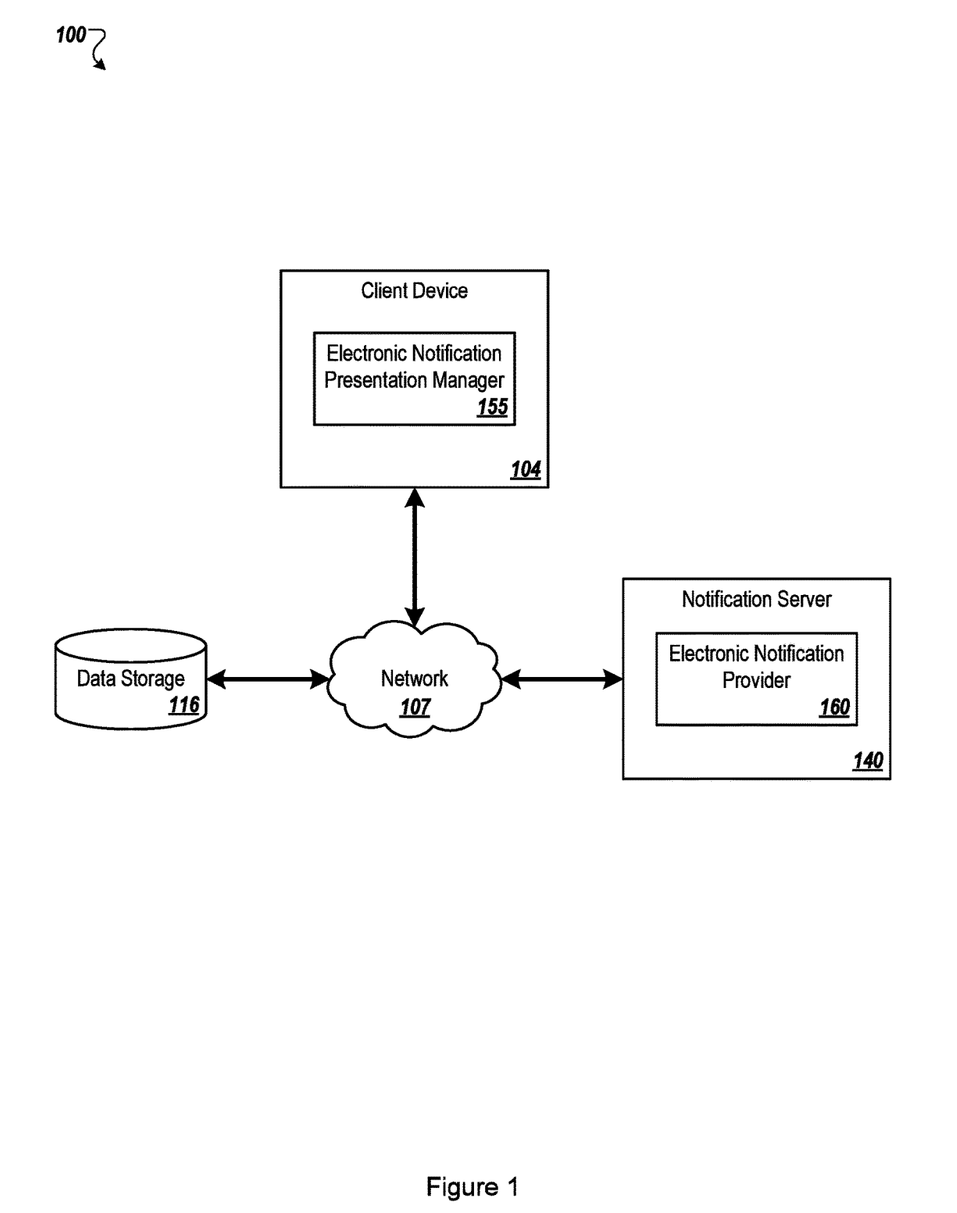
FIG. 1 illustrates a block diagram of an example operating environment of a privacy enhanced notification system.

FIG. 1 illustrates a block diagram of an example operating environment 100 of a privacy enhanced notification system, arranged in accordance with at least one embodiment described herein. The operating environment 100 includes a client device 104, a data storage 116, a notification server 140, and a network 107. The client device 104, the data storage 116, the notification server 140 (collectively, "environment components") may be communicatively coupled via the network 107. The environment components may communicate data and information, such as notifications communicated from the notification server 140 to the client device 104 via the network 107. Each of the environment components are briefly described in the following paragraphs.

The client device 104 may include a processor-based computing system. The client device 104 may include memory, a processor, and network communication capabilities. In the operating environment 100, the client device 104 may be capable of communicating and receiving data and information to and from the notification server 140 via the network 107. Some examples of the client device 104 may include a mobile phone, a smartphone, a tablet computer, a laptop computer, a desktop computer, a set-top box, a virtual-reality device, or a connected device, etc. The client device 104 may include one or more sensors to detect information pertaining to the user of the client device 104, an environment in which the client device 104 is situated, etc. The one or more sensors may include at least one of a clock, camera, microphone, gyrometer, accelerometer, infrared sensor, global positioning system (GPS), near-field communication (NFC) sensor, brightness sensor, proximity sensor, compass, thermometer, step counter, or fingerprint sensor, etc.

The network 107 may include a wired network, a wireless network, or any combination thereof. The network 107 may include any suitable topology, configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

The data storage 116 may include any memory or data storage. The data storage 116 may include one or more sensitivity flags. A sensitivity flag may correspond to a particular situation. A sensitivity flag may indicate how to handle a notification. For example, handling the notification may include one or more of the following: never show the notification, hide the notification until the undesired situation ceases to exist, hide the notification for a particular time period, or hide the notification until a later time or after an event. A sensitivity flag may also correspond to a particular algorithm which may be used to determine how to present a notification in view of the situation. Different algorithms may be used for different situations. For example, a first situation may correspond to a first algorithm and a second situation may correspond to a second algorithm.

The data storage 116 may include network communication capabilities such that the environment components may communicate with the data storage 116. In some embodiments, the data storage 116 may include computer-readable storage media for carrying or having computer-executable instructions or data structures stored thereon. The computer-readable storage media may include any available media that may be accessed by a general-purpose or special-purpose computer, such as a processor. For example, the data storage 116 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 116.

In the depicted embodiment, the data storage 116 is separate from the client device 104. In some embodiments, the data storage 116 may be included in the client device 104 or the client device 104 may include a local data storage similar to the data storage 116 and may access the data storage 116 via the network 107.

The notification server 140 may include a processor-based computing device. For example, the notification server 140 may include a hardware server or another processor-based computing device configured to function as a server. The notification server 140 may include memory and network communication capabilities. In the operating environment 100, the notification server 140 may be configured to communicate with the client device 104, and the data storage 116 via the network 107.

The notification server 140 may include an electronic notification provider 160. The electronic notification provider 160 may generate a notification based on an event. The event may include any event for any application or service. For example, the event may include receipt of an email, text message, completion of a download, an event in an electronic game, etc. In at least one embodiment, the electronic notification provider 160 may generate and deliver a notification to the client device 104 without a specific request from the client device 104. Such a notification may be referred to as a push notification. For example, an application (such as an email application) may receive information (e.g., an email) and may generate a notification of the email. The notification, for example, may include at least some of the email, such as the subject and the first few words of the email. The application may send the notification to the client device 104.

The electronic notification provider 160 may be implemented using hardware including a processor, a microprocessor (e.g., to perform or control performance of one or more operations), an FPGA, or an ASIC. In some other instances, the electronic notification provider 160 may be implemented using a combination of hardware and software. Implementation in software may include rapid activation and deactivation of one or more transistors or transistor elements such as may be included in hardware of a computing system (e.g., the notification server 140). Additionally, software defined instructions may operate on information within transistor elements. Implementation of software instructions may at least temporarily reconfigure electronic pathways and transform computing hardware.

In at least one embodiment, a push notification may at least partially originate from an application on the client device 104. For example, such an application may include an electronic game application. When a certain level of progress is made in the game, for example, the electronic game application may generate a push notification. For example, a user may initiate construction of a digital building within the electronic game application that completes after a predetermined period of time has elapsed. The user may exit the electronic game application before the period of time has elapsed. The electronic game application may generate a push notification to indicate to the user that the construction of the building has completed.

The client device 104 may include an electronic notification presentation manager 155. The electronic notification presentation manager 155 may be configured to receive a notification from the notification server 140 (or from a local application). In response to receiving the notification, the client device 104 may determine a situation, determine whether a user of the client device may desire to prevent others from seeing the notification while in the situation, and determine whether the notification contains sensitive data. When the results of the above determinations are "YES", the client device 104 may set a sensitivity flag to the notification. For example, the client device 104 may query a data storage 116 to identify a sensitivity flag that corresponds to the determinations. The client device 104 may receive the sensitivity flag from the data storage 116. The client may determine how to present the notification based on the sensitivity flag.

The electronic notification presentation manager 155 may be implemented using hardware including a processor, a microprocessor (e.g., to perform or control performance of one or more operations), an FPGA, or an ASIC. In some other instances, the electronic notification presentation manager 155 may be implemented using a combination of hardware and software. Implementation in software may include rapid activation and deactivation of one or more transistors or transistor elements such as may be included in hardware of a computing system (e.g., the client device 104). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. Specifically, the operating environment may include one or more client devices 104, one or more notification servers 140, one or more data storages 116, or any combination thereof. For example, the operating environment 100 may include another system with which the client device 104 interacts based on an authentication message received from the notification server 140.

Moreover, the separation of various components in the embodiments described herein is not meant to indicate that the separation occurs in all embodiments. It may be understood with the benefit of this disclosure that the described environment components may be integrated together in a single component or separated into multiple components.

FIGS. 2-6 illustrate flow diagrams of example methods related to privacy enhanced notification. The methods may be performed by processing logic that may include hardware (circuitry, dedicated logic, etc.), software (such as is run on a general purpose computer system or a dedicated machine), or a combination of both, which processing logic may be included in the operating environment 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 2:
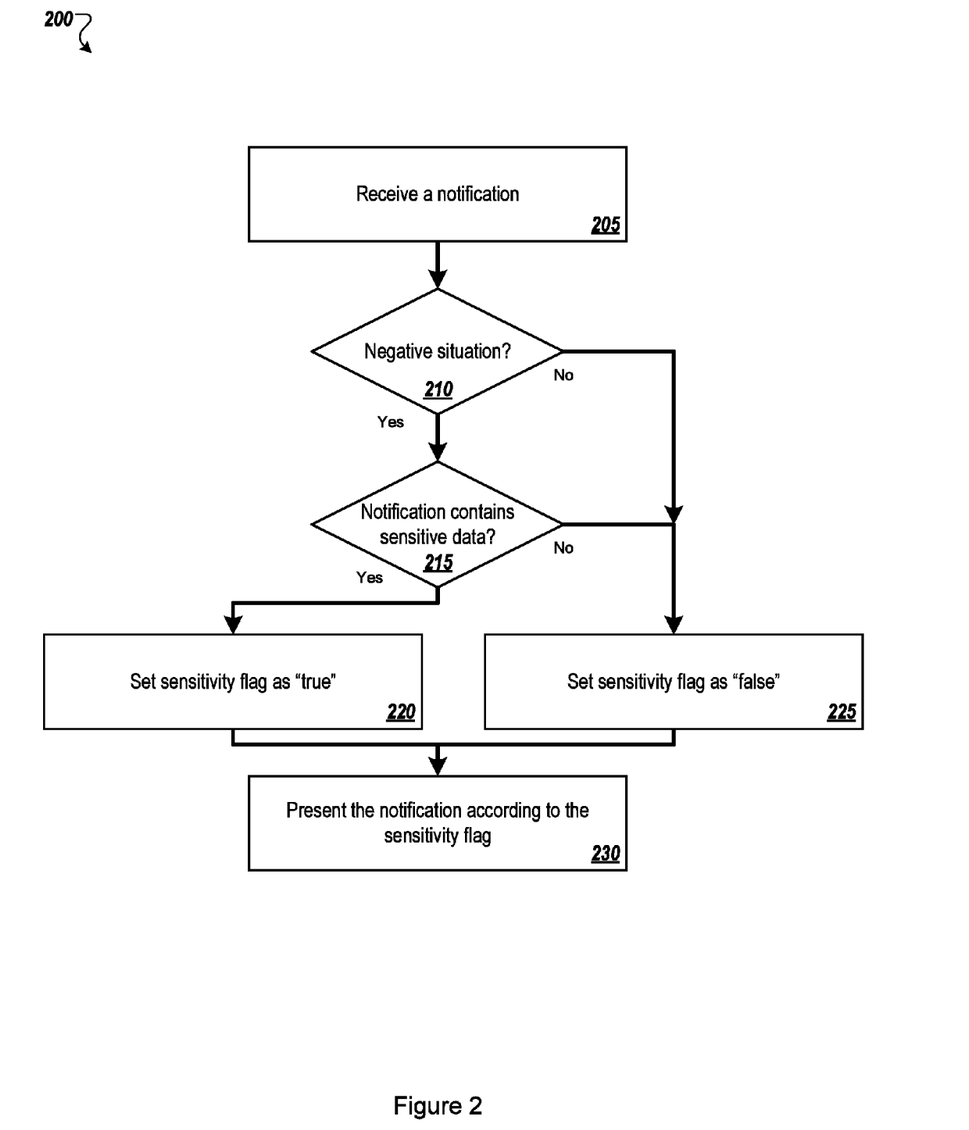
FIG. 2 illustrates a flow diagram of an example method to present a notification in a privacy enhanced notification system.

FIG. 2 illustrates a flow diagram of an example method 200 to present a notification in a privacy enhanced notification system. The method 200 may be performed, at least in part, by processing logic in a client device, such as the client device 104 of FIG. 1. The method 200 may begin at block 205, where the processing logic may receive a notification from a notification server (e.g., from the notification server 140 of FIG. 1) or from a local application.

At block 210, the processing logic may determine whether a negative situation exists in response to receiving the notification. To determine whether the negative situation exists, the processing logic may determine whether a user of the client device may desire to prevent others from seeing the notification while in the situation. Further details pertaining to determine whether a negative situation exists are described in conjunction with FIG. 3. When the negative situation does not exist ("NO") at block 210, the processing logic may proceed to block 225. When the negative situation exists ("YES") at block 210, the processing logic may proceed to block 215.

At block 215, the processing logic may determine whether the notification contains sensitive data. When the notification does not contain sensitive data ("NO") at block 215, the processing logic may proceed to block 225. When the notification contains sensitive data ("YES") at block 215, the processing logic may proceed to block 220. Further details pertaining to determining whether the notification contains sensitive data are described in conjunction with FIG. 4.

When the results of the determinations at both blocks 210 and 215 are "YES", at block 220 the processing logic may set a sensitivity flag for the notification to "true." When one or both of the results of the determinations at blocks 210 and 215 are "NO", at block 225, the processing logic may set a sensitivity flag for the notification to "false."

At block 230, the processing logic may present the notification based on the sensitivity flag. The processing logic may determine how to present the notification based on the sensitivity flag being set to true or false. Further details pertaining to presenting the notification are described in conjunction with FIG. 6.

Figure 3:
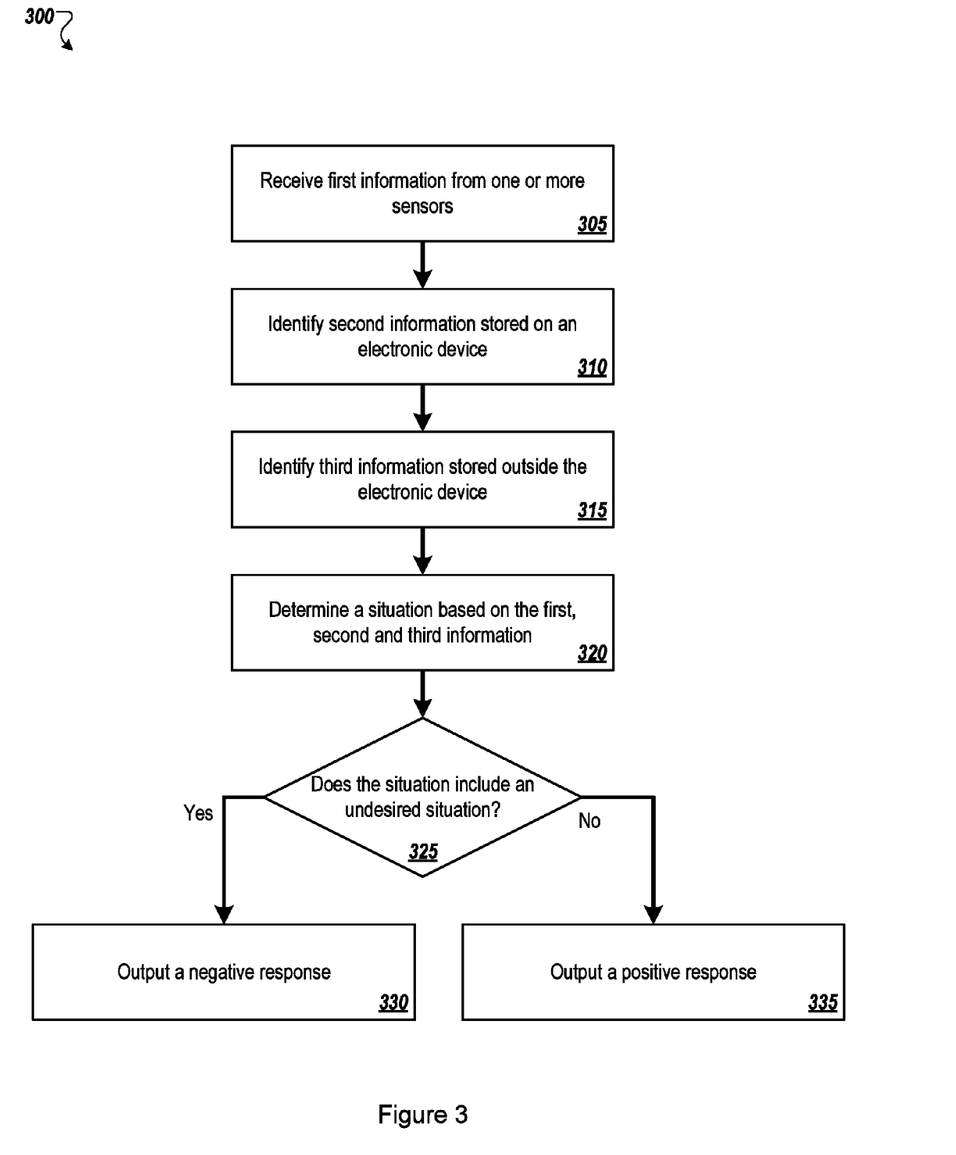
FIG. 3 illustrates a flow diagram of an example method to determine whether a negative situation exists.

FIG. 3 illustrates a flow diagram of an example method 300 to determine whether a negative situation exists. The method 300 may be performed, at least in part, by processing logic in a client device, such as the client device 104 of FIG. 1. In at least one embodiment, method 300 may be performed for the user in response to an execution of at least a portion of method 200. The client device 104 may include or may be communicatively coupled to a non-transitory computer-readable medium having stored thereon or encoded therein programming code or instructions that are executable by a processor to perform or cause performance of the method 300. Additionally or alternatively, the client device 104 may include a processor that is configured to execute computer instructions to perform or control performance of the method 300. Although illustrated as discrete blocks, various blocks may be divided into additional blocks, combined into fewer blocks, or eliminated, depending on the desired implementation.

The method 300 may begin at block 305, where the processing logic may receive first information from one or more sensors. The one or more sensors may include at least one of a clock, camera, microphone, gyrometer, accelerometer, infrared sensor, global positioning system (GPS), near-field communication (NFC) sensor, brightness sensor, proximity sensor, compass, thermometer, step counter, or fingerprint sensor, etc. At block 310, the processing logic may identify second information stored on an electronic device. The second information stored on an electronic device may include user or application preferences pertaining to various situations. At block 315, the processing logic may identify third information stored outside the electronic device. Examples of third information may include information stored on a social network service (e.g., a social graph), information stored on a cloud service, or information stored on another user's device.

At block 320, the processing logic may determine a situation based on at least one of the first, second or third information. For example, the processing logic may use a sensor to determine a situation where a client device is placed on a horizontal surface with the display out of view from others (e.g., facing a table surface). In another example, the processing logic may use a sensor, information stored on the client device, and/or information stored outside the client device to determine a situation where the client device is entering an area where the user may not desire to have sensitive notifications shown on the display of the client device. The area may be pre-defined and information identifying the pre-defined area may be stored on the client device or outside the client device. The processing logic may use a locational sensor (e.g., a GPS) to determine that the client device is entering or exiting the area. In another example, the processing logic may use a camera, an infrared sensor or another sensor to determine that a user of the client device is making a particular motion that expresses the user's negative attitude (e.g., the user shaking his head), which may indicate a situation where the user may not desire to have a sensitive notification to be shown on the display of the client device. In another example, the processing logic may use data received from a microphone to determine the situation. For example, the user may verbally assess a situation, such as by saying words or phrases such as "No," "Confidential," "Private," or "I would like to keep this between us." The processing logic may determine the situation based on the words spoken by the user or by anyone else. In yet a further example, the processing logic may detect other users within a proximity to the user of the client device. The processing logic may detect other users using a camera or infrared coupled with facial recognition technology to determine an identity of the other users. In at least one embodiment, the processing logic may identify devices associated with the other users, such as by using NFC or another device identification technology. The processing logic may check identities of the other users (or the other users' devices), such as against a white list and/or a black list. In at least one embodiment, when at least one of the other users is not on a white list, the processing logic may determine that the situation is negative. In at least one embodiment, when one or more of the other users is on a black list, the processing logic may determine that the situation is negative. A black list or white list may be generated based on based on the settings on a client device. For example, a black list or white list may be based on information about blocked/allowed people in an address book. A black list or white list may also be based on external sources, such as based on social graphs on the Internet (e.g., a social network's blocked user information may be used).

At block 325, the processing logic may determine whether the situation includes an undesired situation. For example, a husband may have planned a surprise birthday party for his wife and desires to keep the party a secret. When the processing logic determines a situation where his wife is near his client device (based on one or more of blocks 305, 310, 315 or 320), the processing logic may determine that such a situation is a negative situation at least with respect to sensitive notifications pertaining to the surprise birthday party. In at least one embodiment, the processing logic may determine a similar negative situation when any of the invitees to the surprise birthday party are close to the wife or when devices of the invitees are close to a device of the wife.

When the processing logic determines that the situation includes an undesired situation ("YES" at block 325), at block 330, the processing logic may output a negative response. When the processing logic determines that the situation does not include an undesired situation ("NO" at block 325), at block 335, the processing logic may output a positive response.

Figure 4:
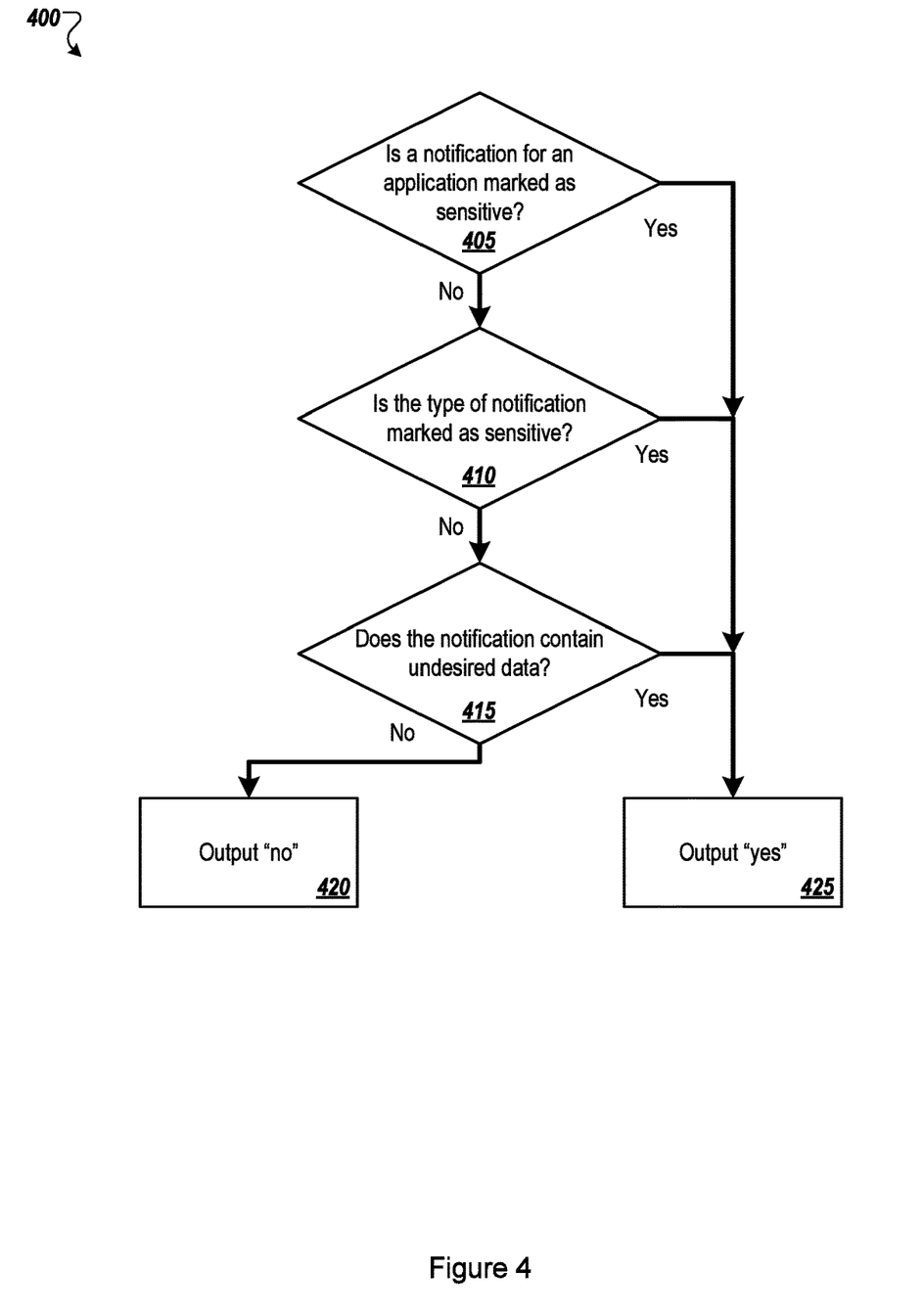
FIG. 4 illustrates a flow diagram of an example method to determine whether a notification may include sensitive information.

FIG. 4 illustrates a flow diagram of an example method 400 to determine whether a notification may include sensitive information. The method 400 may be performed in an operating environment such as the operating environment 100 of FIG. 1. The method 400 may be performed, at least in part, by processing logic in a client device, such as the client device 104 of FIG. 1. In at least one embodiment, method 400 may be performed for the user in response to an execution of at least a portion of method 200 or method 300. The client device 104 may include or may be communicatively coupled to a non-transitory computer-readable medium having stored thereon or encoded therein programming code or instructions that are executable by a processor to perform or cause performance of the method 400. Additionally or alternatively, the client device 104 may include a processor that is configured to execute computer instructions to perform or control performance of the method 400. Although illustrated as discrete blocks, various blocks may be divided into additional blocks, combined into fewer blocks, or eliminated, depending on the desired implementation.

The method 400 may begin at block 405, where the processing logic determines whether a notification for an application is marked as sensitive. The processing logic may use information stored on a client device, or information stored outside a client device to determine whether the notification for the application is marked as sensitive. For example, the processing logic may query a local or remote database to determine this information. In at least one embodiment, a user of the client device may mark (or unmark) applications as being sensitive. Categories or groups of applications may also be marked as sensitive. In at least one embodiment, an application may be marked as sensitive for a predetermined period of time. The user may adjust the predetermined period of time. Continuing the above example regarding the surprise birthday party, a party planning application may be marked as sensitive.

When the processing logic determines that the application has not been marked as sensitive ("NO" at block 405), the processing logic may determine at block 410 whether the type of notification is marked as sensitive. The processing logic may use information stored on a client device, or information stored outside a client device to determine whether the type of notification is marked as sensitive. Notifications may be categorically marked (or unmarked) as being sensitive. For example, voice phone calls, video calls, financial notifications, emails or text messages may be categorically marked as being sensitive. In another example, notifications from certain recipients may be marked as being sensitive. In at least one embodiment, a user of the client device may mark (or unmark) certain type of notifications as being sensitive. In at least one embodiment, a type of notification may be marked as sensitive for a predetermined period of time. The user may adjust the predetermined period of time. Continuing the above example regarding the surprise birthday party, calendar invitations or replies from other (e.g., accept, decline) may be marked as sensitive.

When the processing logic determines that the type of notification has not been marked as sensitive ("NO" at block 410), the processing logic may determine at block 415 whether the notification contains undesired data. The processing logic may analyze the notification to determine any undesired data. Undesired data may include certain keywords including words listed in a black list or words not listed in a white list, data from a person listed in a black list or not listed in a white list, data from a person listed in the black list of a person being together with the user or not listed in the white list of a person being together with the user, etc. Continuing the example above regarding the surprise birthday party, email or text messages including text, icons, emoji, graphics, or icons, etc. that relate to birthdays may be marked as sensitive. When the processing logic determines that the notification does not contain undesired data ("NO" at block 415), the processing logic may output "no" at block 420, which may indicate that the notification is not a sensitive notification.

When the processing logic determines that the notification does contain undesired data ("YES" at one or more of blocks 405, 410 or 415), the processing logic may output "yes" at block 425, which may indicate that the notification is a sensitive notification.

Figure 5:
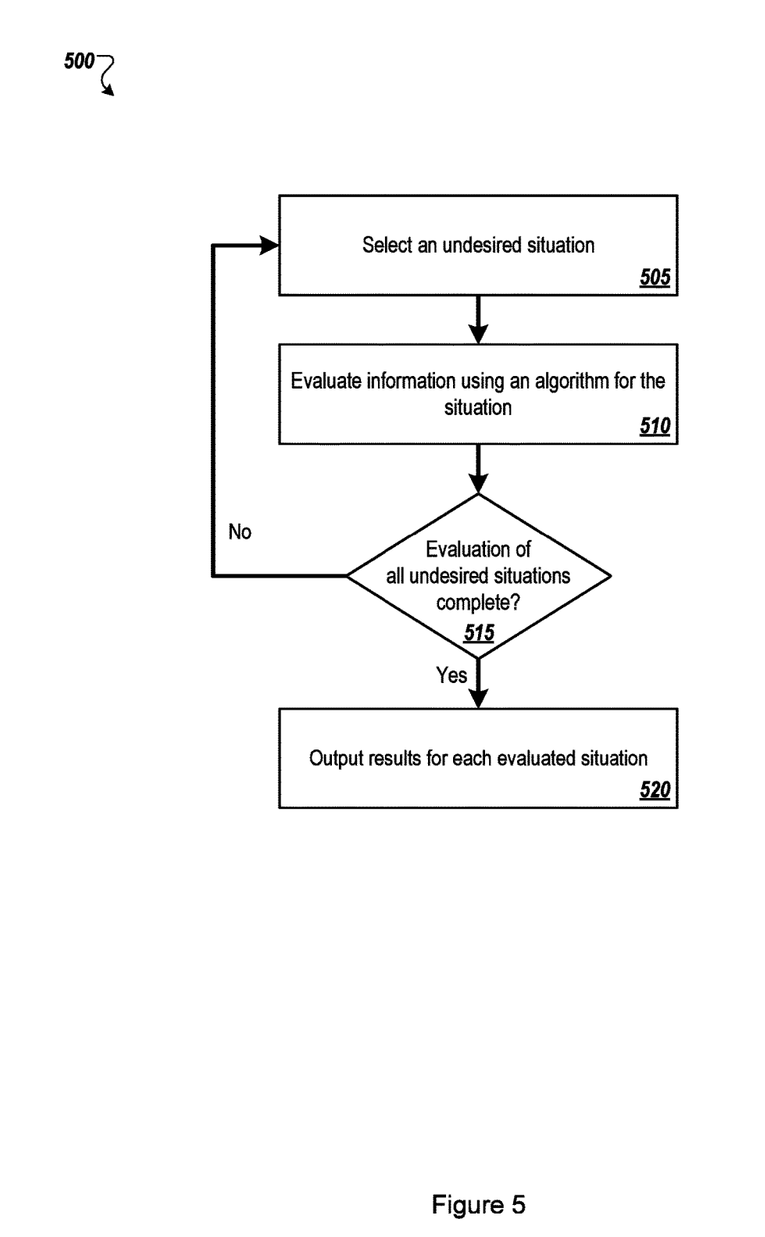
FIG. 5 illustrates a flow diagram of an example method to evaluate an undesired situation.

FIG. 5 illustrates a flow diagram of an example method 500 to evaluate an undesired situation. The method 500 may be performed in an operating environment such as the operating environment 100 of FIG. 1. The method 500 may be performed, at least in part, by processing logic in a client device, such as the client device 104 of FIG. 1. In at least one embodiment, method 500 may be performed for the user in response to an execution of at least a portion of method 200. The client device 104 may include or may be communicatively coupled to a non-transitory computer-readable medium having stored thereon or encoded therein programming code or instructions that are executable by a processor to perform or cause performance of the method 500. Additionally or alternatively, the client device 104 may include a processor that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 505, where the processing logic may select an undesired situation. The undesired situation may include the undesired situation determined at block 210 of FIG. 2 or at block 320 of FIG. 3.

At block 510, the processing logic may evaluate information using an algorithm for the negative situation. In at least one embodiment, some negative situations may be associated with respective evaluation algorithms. For example, a first situation where a user is with a group of friends, one of which is not on a white list, may be associated with a first algorithm. Similarly, a second situation where a user is with a group of friends, one of which is on a black list, may be associated with a second algorithm. Other situations may be associated with other algorithms. If the processing logic identifies or selects a situation that is not associated with a particular algorithm, the processing logic may select an algorithm. In at least one embodiment, the processing logic may use multiple algorithms in such a situation and combine any resulting data, such as by taking an average of the resulting data.

At block 515, the processing logic determine whether other situations are to be evaluated. When an evaluation of all undesired situations is not complete ("NO" at block 515), the processing logic may select another algorithm to evaluate at block 505. When an evaluation of all undesired situations is complete ("YES" at block 515), at block 520, the processing logic output the results for the each of the situations that were evaluated. In at least one embodiment, the results may be used to set a sensitivity flag for the notification, such as in blocks 220 and 225 of FIG. 2.

Figure 6:
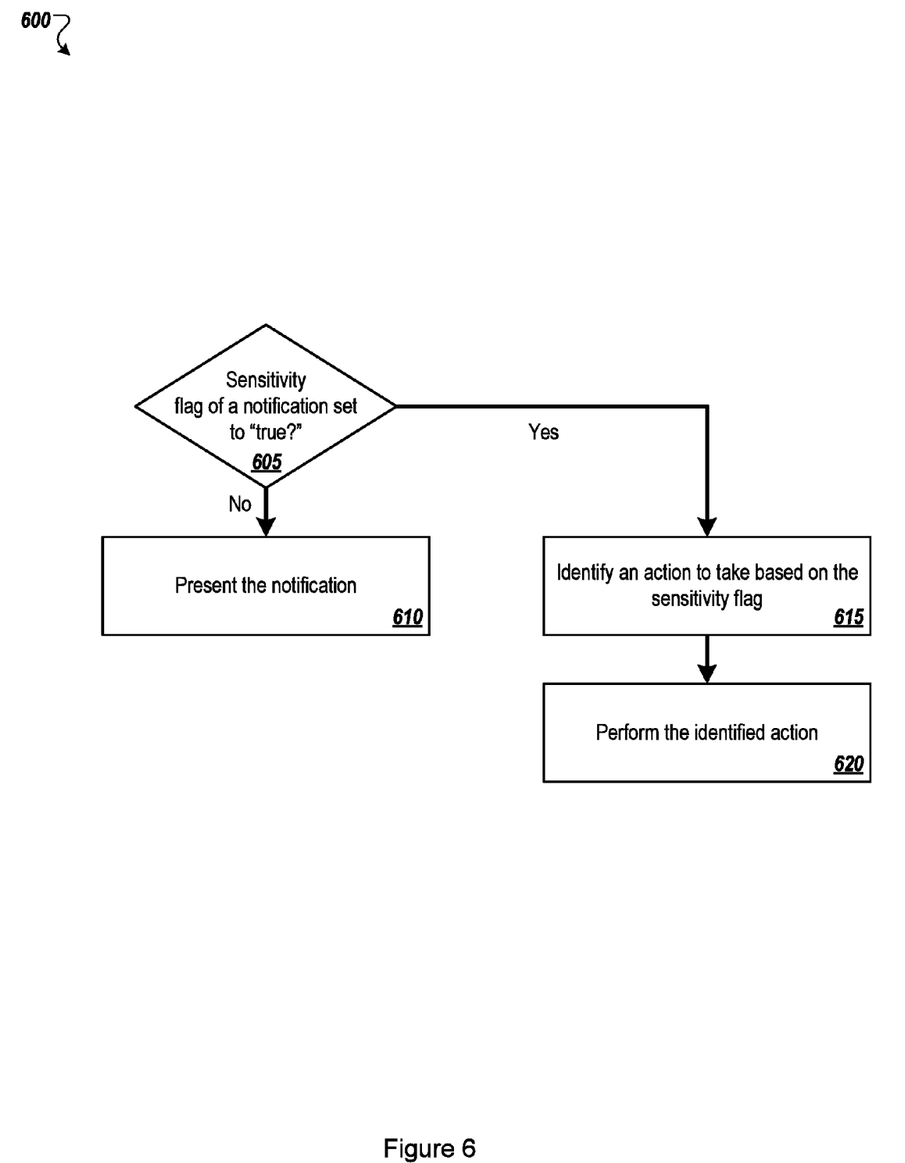
FIG. 6 illustrates a flow diagram of an example method to present a notification based on a sensitivity flag.

FIG. 6 illustrates a flow diagram of an example method 600 to present a notification based on a sensitivity flag. The method 600 may be performed in an operating environment such as the operating environment 100 of FIG. 1. The method 600 may be performed, at least in part, by processing logic in a client device, such as the client device 104 of FIG. 1. In at least one embodiment, method 600 may be performed for the user in response to an execution of at least a portion of methods 200 or 500. The client device 104 may include or may be communicatively coupled to a non-transitory computer-readable medium having stored thereon or encoded therein programming code or instructions that are executable by a processor to perform or cause performance of the method 600. Additionally or alternatively, the client device 104 may include a processor that is configured to execute computer instructions to perform or control performance of the method 600. Although illustrated as discrete blocks, various blocks may be divided into additional blocks, combined into fewer blocks, or eliminated, depending on the desired implementation.

The method 600 may begin at block 605, where the processing logic may determine whether a sensitivity flag of a notification is set to "true." When the sensitivity flag of the notification is set to "false," ("NO" at block 610), the processing logic may present the notification, such as on a display of a client device.

When the sensitivity flag of the notification is set to "true," ("YES" at block 610), the processing logic may identify an action to take based on the sensitivity flag at block 615. Example actions may include not presenting the notification on the display, not presenting the notification on a lock screen of the display, presenting an obscured or encrypted version of the notification, delaying the presentation of the notification on the display for a period of time, or delaying the presentation of the notification on the display until the negative situation is gone, among others. At block 620, the processing logic may perform the action identified at block 615.

Figure 7:
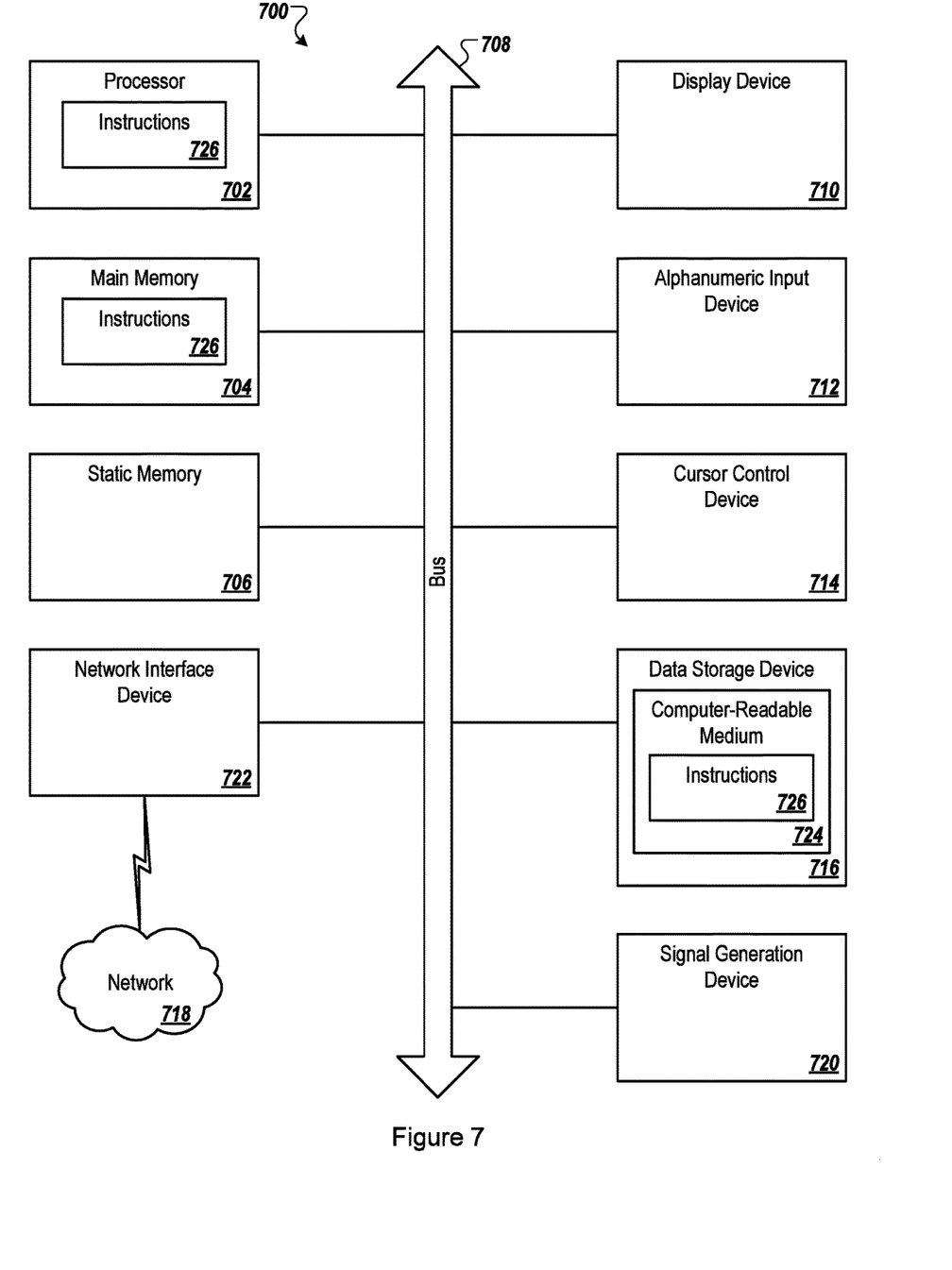
FIG. 7 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 7 illustrates a diagrammatic representation of a machine in the example form of a computing device 700 within which a set of instructions, for causing the machine to perform any one or more of the methods discussed herein, may be executed. The computing device 700 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In one implementation, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 (e.g., operating environment 100 of FIG. 1) embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 726 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Modifications, additions, or omissions may be made to any of the methods described without departing from the scope of the present disclosure. Specifically, any of the methods described may include more or fewer blocks. Further, the blocks in any of the methods described may be arranged in a different order. For example, the method 400 may omit any two of blocks 405, 410 and 415 and may also perform operations described in blocks 405, 410 and 415 in any order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method, comprising:
    receiving, by a client device, a notification associated with an application from a notification server;
    in response to receiving the notification, identifying a negative situation associated with the client device, wherein identifying the negative situation associated with the client device comprises:
        receiving first information from one or more sensors, the information pertaining to an environment in which the client device is currently located;
        determining that the notification includes sensitive data, wherein the sensitive data includes private data pertaining to a user of the client device;
        determining that the negative situation exists based on the first information and the environment in which the client device is currently located, the notification including sensitive data, and a likelihood of an unauthorized user being in the environment;
    setting a sensitivity flag as true in response to the negative situation;
    and
    presenting the notification on an electronic display of the client device according to the sensitivity flag.

2. The method of claim 1, wherein identifying the negative situation associated with the client device comprises:
    identifying second information stored on an electronic device;
    identifying third information stored outside the electronic device;
    determining the situation based on one or more of the first information, the second information, or the third information;
    outputting a negative response in response to a determination that the situation includes the negative situation; and
    outputting a positive response in response to a determination that the situation does not include the negative situation.

3. The method of claim 2, wherein determining whether the situation includes the negative situation comprises evaluating at least one of the first information, the second information, and the third information in view of the situation.

4. The method of claim 1, wherein determining whether the notification includes sensitive data comprises
    determining whether the notification is for an application that has previously been marked as being sensitive;
    identifying a notification type for the notification;
    determining whether the notification type has previously been marked as being sensitive; and
    determining that the notification includes sensitive data when the application has been marked as being sensitive or when the notification type has been marked as being sensitive.

5. The method of claim 1 further comprising evaluating the situation in view of the sensitive data based on a predetermined algorithm associated with the situation.

6. The method of claim 1, wherein presenting the notification on the electronic display of the client device according to the sensitivity flag comprises determining a state of the sensitivity flag, wherein the state of the sensitivity flag comprises true or false.

7. The method of claim 6, wherein presenting the notification on the electronic display of the client device according to the sensitivity flag further comprises:
    identifying an action to take based on the sensitivity flag; and
    performing the action, wherein the action comprises refraining from presenting the notification on an electronic display of the client device when the sensitivity flag is set as true.

8. A system, comprising;
    a memory; and
    a processor operatively coupled to the memory, the processor being configured to perform operations comprising:
        receive a notification associated with an application from a notification server;
        identify a negative situation associated with the system in response to receiving the notification, wherein when identifying the negative situation associated with the system, the processor being configured to perform operations comprising;
            receive first information from one or more sensors, the information pertaining to an environment in which the client device is currently located;
            determine that the notification includes sensitive data, wherein the sensitive data includes private data pertaining to a user of a client device;

determining that the negative situation exists based on the first information and the environment in which the client device is currently located, the notification including sensitive data, and a likelihood of an unauthorized user being in the environment;

set a sensitivity flag as true in response to the negative situation; and present the notification on an electronic display of the client device according to the sensitivity flag.

9. The system of claim 8, the processor being further configured to perform operations comprising evaluate the situation in view of the sensitive data based on a predetermined algorithm associated with the situation.

10. The system of claim 9, wherein when identifying the negative situation associated with the system, the processor being configured to perform operations comprising:

identify second information stored in the memory;

identify third information stored outside the memory;

determine the situation based on one or more of the first information, the second information, or the third information;

output a negative response in response to a determination that the situation includes the negative situation; and output a positive response in response to a determination that the situation does not include the negative situation.

11. The system of claim 10, wherein when determining whether the situation includes the negative situation, the processor being configured to perform operations comprising evaluate at least one of the first information, the second information, and the third information in view of the situation.

12. The system of claim 8, wherein when determining whether the notification includes sensitive data, the processor being configured to perform operations comprising:

determine whether the notification is for an application that has previously been marked as being sensitive;

identify a notification type for the notification;

determine whether the notification type has previously been marked as being sensitive; and determine that the notification includes sensitive data when the application has been marked as being sensitive or when the notification type has been marked as being sensitive.

13. The system of claim 8, the processor being further configured to perform operations comprising evaluate the situation in view of the sensitive data based on a predetermined algorithm associated with the situation.

14. The system of claim 13, wherein when presenting the notification on the electronic display of the system according to the sensitivity flag, the processor being configured to perform operations comprising determine a state of the sensitivity flag, wherein the state of the sensitivity flag comprises true or false.

15. A non-transitory computer-readable medium having encoded therein programming code executable by a processor to perform or control performance of operations comprising:

receiving, by a client device, a notification associated with an application from a notification server;

in response to receiving the notification, identifying a negative situation associated with the client device, wherein identifying the negative situation associated with the client device comprises:

receiving first information from one or more sensors, the information pertaining to an environment in which the client device is currently located;

determining that the notification includes sensitive data, wherein the sensitive data includes private data pertaining to a user of the client device;

determining that the negative situation exists based on the first information and the environment in which the client device is currently located, the notification including sensitive data, and a likelihood of an unauthorized user being in the environment;

setting a sensitivity flag as true in response to the negative situation; and presenting the notification on an electronic display of the client device according to the sensitivity flag.

16. The non-transitory computer-readable medium of claim 15, wherein identifying the negative situation associated with the client device comprises:

identifying second information stored on an electronic device;

identifying third information stored outside the electronic device;

determining the situation based on one or more of the first information, the second information, or the third information;

outputting a negative response in response to a determination that the situation includes the negative situation; and outputting a positive response in response to a determination that the situation does not include the negative situation.

17. The non-transitory computer-readable medium of claim 16, wherein determining whether the situation includes the negative situation comprises evaluating at least one of the first information, the second information, and the third information in view of the situation.

18. The non-transitory computer-readable medium of claim 15, wherein determining whether the notification includes sensitive data comprises determining whether the notification is for an application that has previously been marked as being sensitive;

identifying a notification type for the notification;

determining whether the notification type has previously been marked as being sensitive; and determining that the notification includes sensitive data when the application has been marked as being sensitive or when the notification type has been marked as being sensitive.

19. The non-transitory computer-readable medium of claim 15, the operations further comprising evaluating the situation in view of the sensitive data based on a predetermined algorithm associated with the situation.

20. The non-transitory computer-readable medium of claim 15, wherein presenting the notification on the electronic display of the client device according to the sensitivity flag comprises determining a state of the sensitivity flag, wherein the state of the sensitivity flag comprises true or false.

* * * * *